Figure 1:
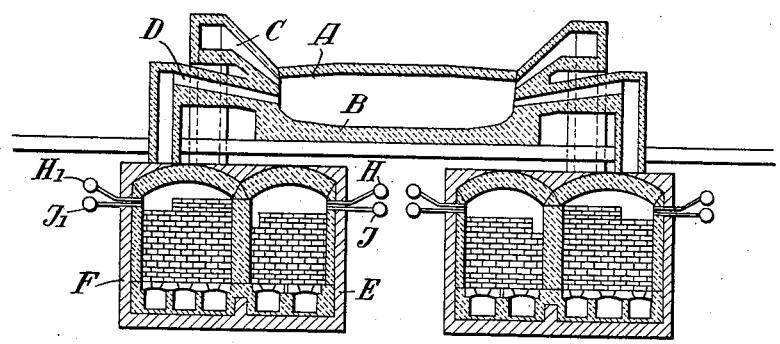

May 31, 1938.   J. HAAG   2,118,921
METHOD OF CONTROLLING A GAS HEATED METALLURGICAL
FURNACE PROVIDED WITH REGENERATORS
Filed June 23, 1936

Inventor:
JOHANNES HAAG
By Haseltine, Lake & Co.
Attorneys

Patented May 31, 1938

2,118,921

UNITED STATES PATENT OFFICE 2,118,921

METHOD OF CONTROLLING A GAS-HEATED METALLURGICAL FURNACE PROVIDED WITH REGENERATORS

Johannes Haag, Neunkirchen, Germany

Application June 23, 1936, Serial No. 86,708
In Germany June 27, 1935

2 Claims. (Cl. 263—15)

The invention relates to a method of operating gas-heated metallurgical smelting furnaces provided with regenerators. In these smelting furnaces operating, for example, on the Siemens-Martin principle, the entire operation of the furnace is greatly influenced by the height of the temperature of the combustion and waste gases, both when the waste gases are drawn off through the flue and when they are drawn off by an exhauster for use with a waste-heat boiler.

The furnace temperature in the smelting chamber is substantially determined by the degree of pre-heating which the gases and the air in the regenerators have received. Now, if the chequer work in the regenerators traversed by the waste gases is not sufficiently heated due to low waste gas temperatures, for example, such as may occur in the case of temporarily incorrect adjustment of the mixture of gas and air or owing to a disturbance in the operation or the like, the fresh gas and air in the cooled chambers are not sufficiently preheated after the changing over of the furnace.

The known great difficulty of regulating a furnace plant operated by the regenerative system is particularly noticeable after stopping the furnace. The re-heating of a furnace having chequer work in front of and behind the smelting chamber takes an exceptionally long time, particularly when the gases used have only a small heating value.

The invention is intended to obviate these drawbacks and has the particular object of rendering such regenerative furnaces very adaptable for momentary operating conditions and easily regulatable. According to the invention, this is achieved by regulating the temperature of the regenerator chambers by additional heating, which may take the form of a coke, generator, blast furnace or mixed gas heating.

It may appear to be inconsistent per se, in regenerator chambers adapted for operation with waste gases, to burn fresh gas whose heat content is only used in part for the heating of the chequer work, while a considerable portion of this heat content only increases the temperature of the waste gases escaping into the flue. The purely thermal consideration, from which only the lowest possible waste-gas temperature must appear desirable, does not, however, give regard to the operating conditions, because if the chequer work in the generators has become cold, owing to any particular reason, re-heating of the chequer work and the furnace takes a very long time, that is to say, the smelting process is retarded to an exceptional degree, whereby the output of the furnace is greatly reduced, which at the same time means very high heat losses over a long period.

Furthermore, the additional heating affords a result of vital importance from the point of view of operation, which resides in that the regulatability of the furnace is considerably improved, so that the operation of the furnace may be accurately adapted to the metallurgical conditions and to the charge to be smelted in each case.

A further important advantage resides in that by the additional heating of the chequer work the quality of the heating gas is rendered immaterial. For example, in the method according to the invention blast-furnace gases may be used in much greater quantities than heretofore, as the decomposition temperatures of the heavy hydrocarbons are reached in the chambers, whereby the thermal effect of these gases is improved.

The burners for the additional heating are preferably so disposed with relation to the chambers that the entire chequer work is reached by the flames, so that the so-called dead spaces are limited or even entirely obviated and the efficiency of the chamber is thereby considerably increased.

If a chamber which has become cold during the operation of the furnace should be additionally heated according to the invention, the combustion temperature of the gas to be pre-heated and of the air is rapidly brought to the most suitable level after the change over. In this way, the temperature of the waste gases is also again increased, so that the other chambers which have become cold are also again heated to a higher temperature. Consequently, the additional heating of the chambers may be accordingly kept lower or be entirely stopped.

In order to avoid careless control of the additional burners, the control means for the burners is preferably coupled with the control members for the main gas and air conduit, so that, for example, the burners of a chamber are stopped when it is changed over to fresh gas or fresh air.

Figure 2:
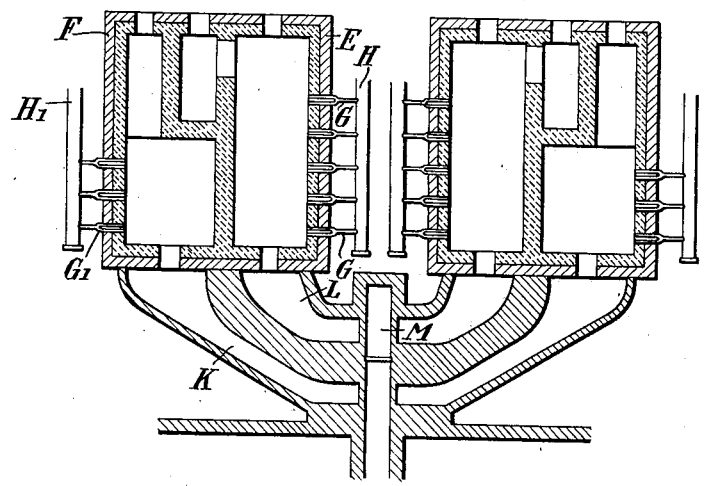

A constructional example of the invention is diagrammatically illustrated in the accompanying drawing, in which:

Figure 1 is a vertical section through a normal open-hearth furnace for the production of ingot iron and steel, and Figure 2 is a horizontal section through the preheating chambers.

The furnace consists of the furnace space A, in which the hearth B is situated. The air supply pipes C and the gas supply pipe D lead into both ends of the furnace space. For the preheating of the air a chamber E is provided, and for the preheating of the gas a chamber F. These so-called regenerator chambers are filled in known manner with a chequer work of fireproof bricks. In the side wall of the air preheating chamber E a series of burners G are provided, which are fed by two pipes H, I extending alongside the chamber, the pipe H, for example, supplying the air and the pipe I the gas. Naturally, oil burners may also be provided instead of the gas burners.

The gas preheating chamber F is provided with corresponding burners $G^1$ and corresponding pipes $H^1$ and $J^1$.

From the chambers E and F, conduits K and L extend to a change-over valve M, but these parts are again of normal construction and therefore do not require detailed description.

Practical tests of the invention have shown surprising advantages. The total heat consumption for a ton of crude steel previously amounted to 1,179,490 calories on an average taken over one year. In spite of unfavourable conditions for the introduction of the invention, this has been reduced to about 1,000,000 calories including the heat consumption of the additional burners and, taking into account the quantity of heat recovered from the increased waste heat, to about 930,000 calories.

At the same time, the pig iron consumption with a total charge of 66,000 kilogrammes was reduced from 12,500 to 11,000 kilogrammes, and the lime consumption decreased from 3,510 kilogrammes to 3,100 kilogrammes, that is to say, by 11.65%.

What I claim and desire to secure by Letters Patent of the United States is:—

1. In the operation of a gas-heated metallurgical furnace provided with regenerators heated by substantially completely combusted waste gases with the regenerators permanently connected to the furnace for cooperative simultaneous operation with the furnace and having checker work therein, the method consisting in regulating the temperature of the regenerator chambers by burning fresh fuel within said regenerators to provide heat additional to the sensible heat of the waste gases.

2. In the operation of a gas-heated metallurgical furnace provided with regenerators heated by substantially completely combusted waste gases with the regenerators permanently connected to the furnace for cooperative simultaneous operation with the furnace and having checker work therein, the method consisting in regulating the temperature of the regenerator chambers by burning fresh fuel within said regenerators at the points of entry of the waste gases into the regenerator chamber to provide heat additional to the sensible heat of the waste gases.

JOHANNES HAAG.